United States Patent
Barnett et al.

(10) Patent No.: US 10,239,068 B1
(45) Date of Patent: Mar. 26, 2019

(54) PORTABLE SPREADER FOR PARTICULATE MATTER

(71) Applicant: ICG SaltShooter, LLC, Penn Valley, PA (US)

(72) Inventors: Wade Charles Barnett, Penn Valley, PA (US); Matthew S. Kressy, Wellesley, MA (US)

(73) Assignee: ICG Saltshooter LLC, Penn Valley, PA (US)

( * ) Notice: Subject to any disclaimer, the term of this patent is extended or adjusted under 35 U.S.C. 154(b) by 0 days.

(21) Appl. No.: 15/137,093

(22) Filed: Apr. 25, 2016

Related U.S. Application Data

(63) Continuation of application No. 14/016,338, filed on Sep. 3, 2013, now abandoned, which is a continuation of application No. 13/680,064, filed on Nov. 18, 2012, now abandoned, which is a continuation of application No. 12/794,762, filed on Jun. 6, 2010, now abandoned.

(51) Int. Cl.
*B05B 3/12* (2006.01)
*B05B 12/00* (2018.01)
*B05B 15/62* (2018.01)

(52) U.S. Cl.
CPC .............. *B05B 3/12* (2013.01); *B05B 12/002* (2013.01); *B05B 15/62* (2018.02)

(58) Field of Classification Search
CPC ......... B05B 11/00; B05B 3/12; B05B 15/061; B05B 12/002; A01C 7/02
USPC ........................................ 239/655, 654, 664
See application file for complete search history.

(56) References Cited

U.S. PATENT DOCUMENTS

| | | | | |
|---|---|---|---|---|
| 425,338 A * | 4/1890 | Muller | ................... | B65G 53/46 239/654 |
| 2,892,286 A * | 6/1959 | Martin | ................... | A01C 15/04 222/175 |
| 2,957,268 A * | 10/1960 | Santarelli | ............ | A01M 9/0015 222/240 |
| 3,174,251 A * | 3/1965 | West | ...................... | A01C 15/04 222/200 |
| 4,140,280 A * | 2/1979 | Allen | ..................... | A01C 15/02 239/654 |
| 6,425,500 B2 * | 7/2002 | McNally | ............. | E01C 19/2025 222/175 |

* cited by examiner

*Primary Examiner* — Darren W Gorman
*Assistant Examiner* — Qingzhang Zhou
(74) *Attorney, Agent, or Firm* — Mary M. Lee

(57) ABSTRACT

A gravity-feed spreader for particulate matter may include a rotor. The spreader may be operable for gravity-feed operation with the longitudinal axis of the rotor in a horizontal position. A generally cylindrical rotor housing with a pair of closed, axial ends may be coaxial with the rotor. Entrance and exit apertures for the particulate matter may be formed in the surface of the rotor housing between the closed, axial ends. A rotor driver may be coupled to the rotor shaft for rotating the rotor. An intake housing may include a passageway therethrough for the particulate matter. A gate may be provided for selectively opening and closing the particulate matter passageway in the intake housing. An agitator may be coupled to the rotor shaft for facilitating movement of particulate matter through the passageway in the intake housing.

9 Claims, 8 Drawing Sheets

PORTABLE SPREADER FOR PARTICULATE MATTER

CROSS-REFERENCE TO RELATED APPLICATIONS

This application is a continuation of U.S. nonprovisional patent application Ser. No. 14/016,338, filed on Sep. 3, 2013, entitled "Portable Spreader for Particulate Matter," which is a continuation of U.S. nonprovisional patent application Ser. No. 13/680,064, filed on Nov. 18, 2012, entitled "Portable Spreader for Particulate Matter," which is a continuation of U.S. nonprovisional patent application Ser. No. 12/794,762 filed on Jun. 6, 2010, entitled "Portable Spreader for Particulate Matter," and the contents of these prior applications are incorporated herein by reference.

BACKGROUND OF THE INVENTION

Field of the Invention

The invention relates, in general, to spreaders for distributing particulate matter and, in particular, to man-portable spreaders for distributing particulate matter.

Description of the Related Art

Some conventional spreaders for distributing particulate matter may rely in whole or in part on entraining the particulate matter in air. Using air to entrain the particulate matter may require high power to generate sufficient air velocity and may generate undesirable noise.

Some conventional spreaders may use an impeller with a vertical axis of rotation. Impellers with a vertical axis of rotation may jam easily. Impellers with a vertical axis of rotation may impart only a small tangential trajectory to the particulate matter, unless the trajectory of the particulate matter is altered by contact or collision with an exit nozzle. If the particulate matter does collide with an exit nozzle, the particulate matter may be fractured or pulverized.

Ease of handling and operation may be another problem with known spreaders. The user may have difficulty supporting the spreader because of the location of the center of gravity of the spreader relative to the handle of the spreader. The center of gravity of the spreader is affected by the location of the container for the particulate matter.

A need exists for a portable spreader for particulate matter that is efficient, ergonomically designed, and inexpensive to manufacture.

SUMMARY OF THE INVENTION

In one aspect, a gravity-feed spreader for particulate matter may include a rotor having a shaft, at least one paddle, and a longitudinal axis of rotation. The spreader may be operable for gravity-feed operation with the longitudinal axis of rotation of the rotor in a horizontal position. A generally cylindrical rotor housing may be coaxial with the rotor. The rotor housing may include a pair of closed, axial ends.

An entrance aperture for the particulate matter may be formed in a surface of the rotor housing between the closed, axial ends. An exit aperture for the particulate matter may be formed in a surface of the rotor housing between the closed, axial ends. A rotor driver may be coupled to the rotor shaft for rotating the rotor.

An intake housing may include a passageway therethrough for the particulate matter. The intake housing may have a first end in communication with the entrance aperture of the rotor housing and a second end. A gate for selectively opening and closing the particulate matter passageway may be disposed in the intake housing. The gate may be continuously adjustable between fully open and fully closed positions. An agitator may be coupled to the rotor shaft for facilitating movement of particulate matter through the passageway in the intake housing.

A support member may be connected to the rotor housing and the intake housing. A handle may be connected to the support member.

At least one paddle may extend axially substantially an entire distance between the closed, axial ends of the rotor housing and radially substantially to the curved surface of the rotor housing.

The spreader may include an exit channel for the particulate matter extending from the exit aperture of the rotor housing. The rotor driver may be mechanically coupled to the rotor shaft. There may be a plurality of paddles on the rotor.

The spreader may include a canister for holding the particulate matter. The canister may be connected to the second end of the intake housing. A longitudinal axis of the handle and a longitudinal axis of the canister may be substantially parallel.

The rotor driver may be a motor. The spreader may include an on/off control for the motor. The on/off control may be located on the handle. The on/off control may control positions of the gate including continuous adjustment from the fully open position to the fully closed position. When the spreader is actuated from an off state to an on state, the on/off control may start the motor before opening the gate. When the spreader is actuated from the on state to the off state, the on/off control may stop the motor after the gate is closed.

The support member may include a battery housing. The spreader may include at least one battery disposed in the battery housing.

The exit channel may include a lower surface that may be substantially planar. When the spreader is operable for gravity-feed operation with the longitudinal axis of rotation of the rotor in a horizontal position, the lower surface of the exit channel may lie substantially in a horizontal plane.

The invention will be better understood and further objects, features, and advantages of the invention will become more apparent, from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 1 is a perspective view of an embodiment of a portable spreader for particulate matter.

FIG. 2 is a partially cut away, perspective view of the spreader of FIG. 1.

FIG. 3 is a partially cut away, perspective view of the spreader of FIG. 1, showing one way to couple a motor and a rotor.

FIG. 4 is a partially cut away, perspective view of another side of the spreader of FIG. 1, showing an embodiment of an agitator.

FIG. 5 is an enlarged view of a portion of FIG. 4.

DETAILED DESCRIPTION OF THE PREFERRED EMBODIMENTS

Figure 1:
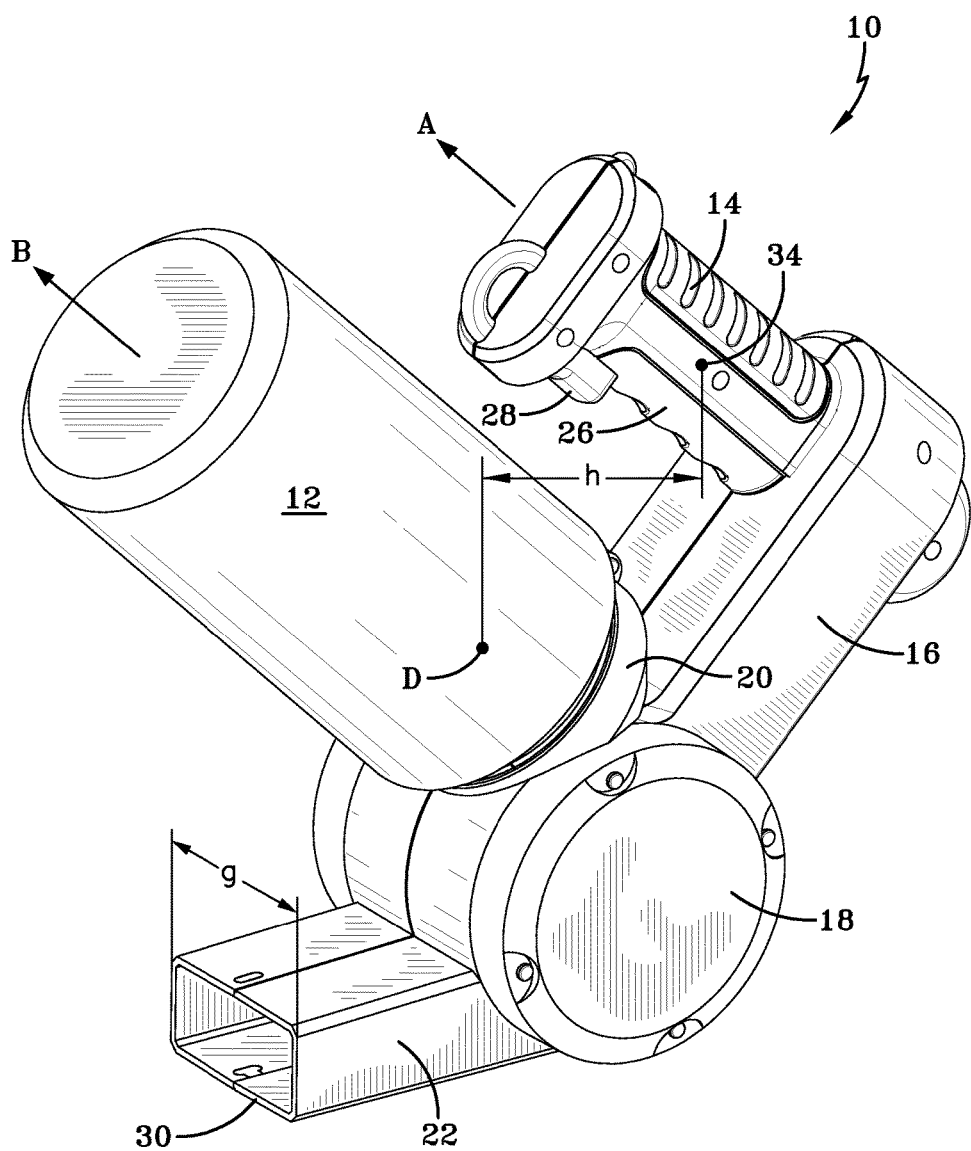

FIG. 1 is a perspective view of an embodiment of a gravity-feed portable spreader 10 for spreading particulate matter. Spreader 10 may be used to distribute or spread particulate matter. By way of example, and not limitation, particulate matter may include plant seeds, grass seeds, fertilizer, calcium chloride, sodium chloride (de-icing salt), herbicides, etc. The size of the individual particles in the particulate matter may vary from small, such as powdery materials, to larger materials such as sodium chloride crystals, or even particles larger than sodium chloride crystals. Spreader 10 may include a canister 12, a handle 14, a first housing 16, a second or main housing 18, an intake housing 20, and an exit channel 22.

Canister 12 may function as a storage container for the particulate matter to be spread. Canister 12 may be formed integrally with intake housing 20 or may be removably connected to intake housing 20. For example, canister 12 and intake housing 20 may include complementary threads for threaded engagement. If canister 12 is integral with intake housing 20, then a means for filling the canister, such as a door or threaded cap, may be provided in a surface of the canister 12.

Handle 14 may include a grip portion 26 where a user's fingers may be placed. A control 28 may be located on handle 14. In the embodiment shown, the control 28 is a trigger-type switch located on the grip portion 26, although other types of controls may be used. Handle 14 and canister 12 may have respective longitudinal axes A and B. In one embodiment, axes A and B may be substantially parallel. With axes A and B parallel, the distance h between a midpoint 34 of the grip portion 26 and the center of gravity D of the spreader 10 may be minimized, which may enhance the ease of using the spreader 10.

Figure 2:
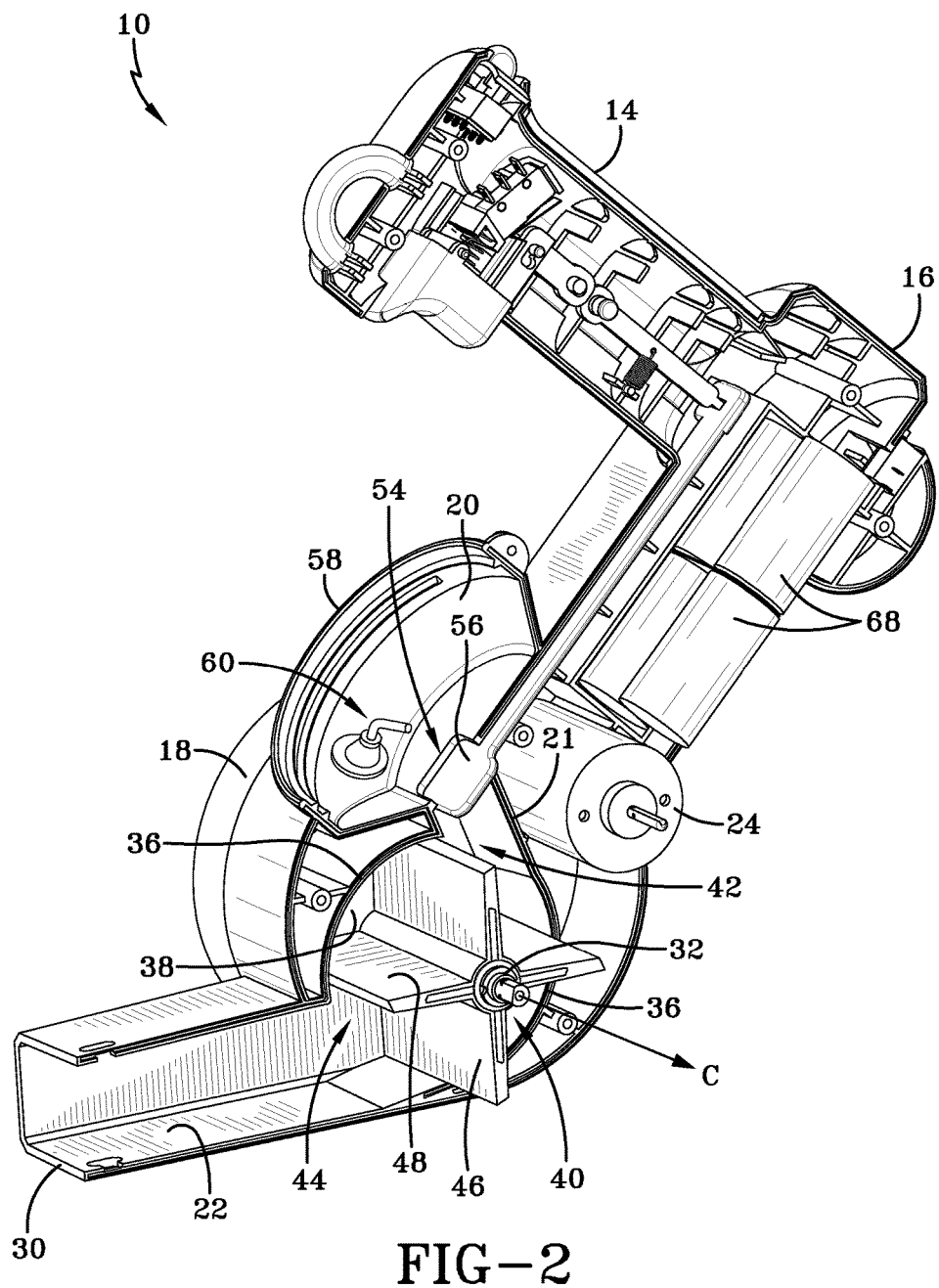

FIG. 2 is a partially cut away, perspective view of the spreader 10 of FIG. 1. Spreader 10 may include a rotor housing 36. Rotor housing 36 may be generally cylindrical and may have a longitudinal axis C. Opposed, axial ends 38, 40 of rotor housing 36 may be closed. In FIG. 2, the closed end 40 of rotor housing 36 is cut away, but closed axial end 40 may be formed like closed axial end 38. An entrance aperture 42 for particulate matter may be formed in a curved surface of the rotor housing 36 between axial closed ends 38 and 40. An exit aperture 44 for particulate matter may be formed in the curved surface of the rotor housing 36 between axial closed ends 38 and 40.

A rotor 46 having a rotor shaft 32 may be disposed in rotor housing 36. Rotor 46 and rotor housing 36 may be coaxially disposed on longitudinal axis C. The axis C may be perpendicular to the longitudinal axis L (FIG. 8) of the first housing 16. Spreader 10 may be operable for gravity-feed operation with the longitudinal axis C of the rotor 46 in a horizontal position. Rotor 46 may include at least one paddle 48. In some embodiments, a plurality of paddles 48 may be used. In FIG. 2, four paddles 48 are shown, but fewer or more paddles 48 may be used. Paddle or paddles 48 may be planar or substantially planar, that is, flat or substantially flat, or may have other forms. Paddle or paddles 48 may be made of one or more solid materials.

At least the outer surface of paddles 48, that is, the surface that contacts and propels the particulate matter, may be a soft material, such as an elastomer, a fabric, etc. A soft material may prevent pulverization of the particulate matter. Pulverization of the particulate matter may adversely affect the performance of spreader 10. The outer surface of paddles 48 may have a hardness in a range of about 30-70 Shore A durometer.

Figure 7:
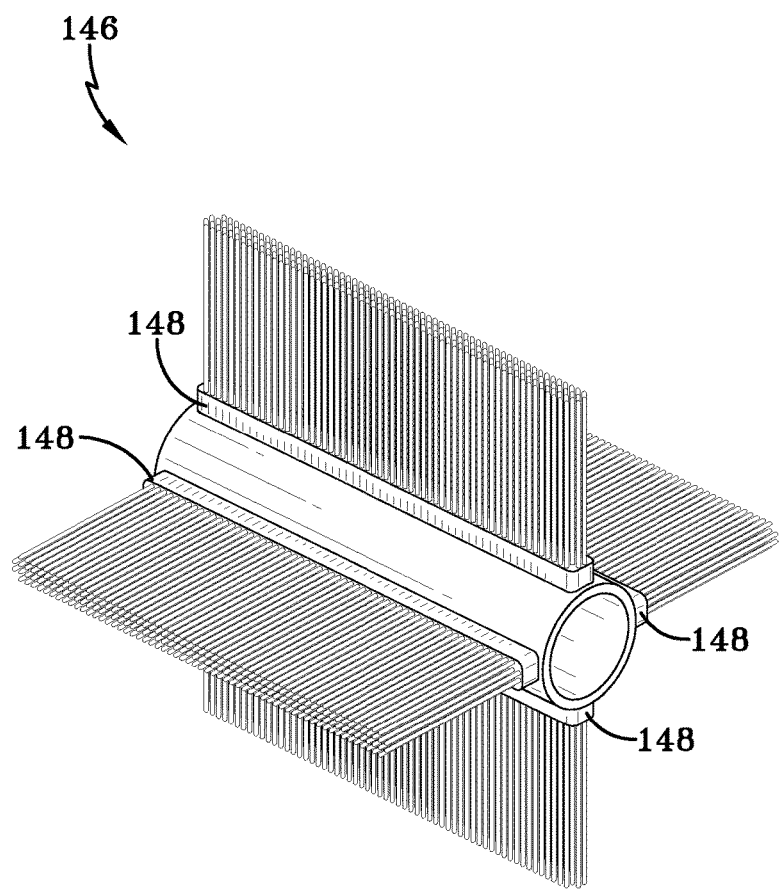
FIG. 7 is a perspective view of a rotor having a paddle in the form of a brush.

Paddle or paddles 48 may be in the form of a stiff brush or brushes. FIG. 7 is a perspective view of a rotor 146 having a paddle 148 in the form of a brush. A paddle 148 formed of a brush may be planar, as shown in FIG. 7, or may have other forms, such as a helix, etc. A paddle formed of a brush may be stiff. The brush may be made of a plurality of bristles fixed to the center of the rotor 146.

Paddles 48 (whether in the form of a brush or any other material) may extend the entire length, or substantially the entire length, of rotor 46 between axial ends 38, 40 of rotor housing 36. There may be only enough clearance between paddles 48 and the axial ends 38, 40 of rotor housing 36 to prevent contact between the paddles 48 and the axial ends 38, 40. The paddles 48 may extend radially from the center of rotor 46 to, or substantially to, the curved surface of rotor housing 36. There may be sufficient clearance between the radial edges of paddles 48 and the curved surface of housing 36 to prevent contact between the two. Or, in the case of a paddle 48 that is a brush, the paddle may contact the curved surface of housing 36.

The width of the exit aperture 44 in the rotor housing 36, that is, the dimension parallel to axis C, may be the same as the distance between the axial ends 38, 40 of the rotor housing 36. An exit channel 22 for particulate matter may extend from the exit aperture 44 of the rotor housing 36. The width g of the exit channel 22 (FIG. 1) may be the same or different than the width of the exit aperture 44. The width of the exit channel 22 may be constant or may vary. Exit channel 22 may include a bottom surface 30.

A support member may be connected to the rotor housing 36 and the intake housing 20. The support member may include the first and/or second housings 16, 18. Handle 14 may be connected to the support member. For example, handle 14 may be connected to first housing 16.

The intake housing 20 may define a passageway 54 therethrough for particulate matter. Intake housing 20 may include a first end 21 in communication with the entrance aperture 42 of the rotor housing 36 and a second end 58. Canister 12 (FIG. 1) may be formed integrally with intake housing 20 or may be removably connected to intake housing 20 at second end 58. A gate 56 may be disposed in intake housing 20 for selectively opening and closing the passageway 54 in the intake housing 20.

In FIG. 2, the gate 56 is shown displaced upwardly somewhat from the entrance aperture 42 of the rotor housing 36. In some embodiments, the gate 56 may selectively open and close the passageway 54 in intake housing 20 by opening and closing the entrance aperture 42. Flow of particulate matter through intake housing 20 may be aided by an agitator 60, discussed in more detail below.

Shaft 32 of rotor 46 may be coupled to a rotor driver for rotating the rotor 46. The rotor driver may be, for example, a hand crank (not shown), or, rotor 46 may be rotated by a motor 24. Motor 24 may be, for example, an alternating current (AC) electric motor, a direct current (DC) electric motor, an air motor, a hydraulic motor, an internal combustion engine, etc. Motor 24 may be connected to rotor 46 in a variety of conventional manners. Motor 24 may be located, for example, in second housing 18.

Figure 3:
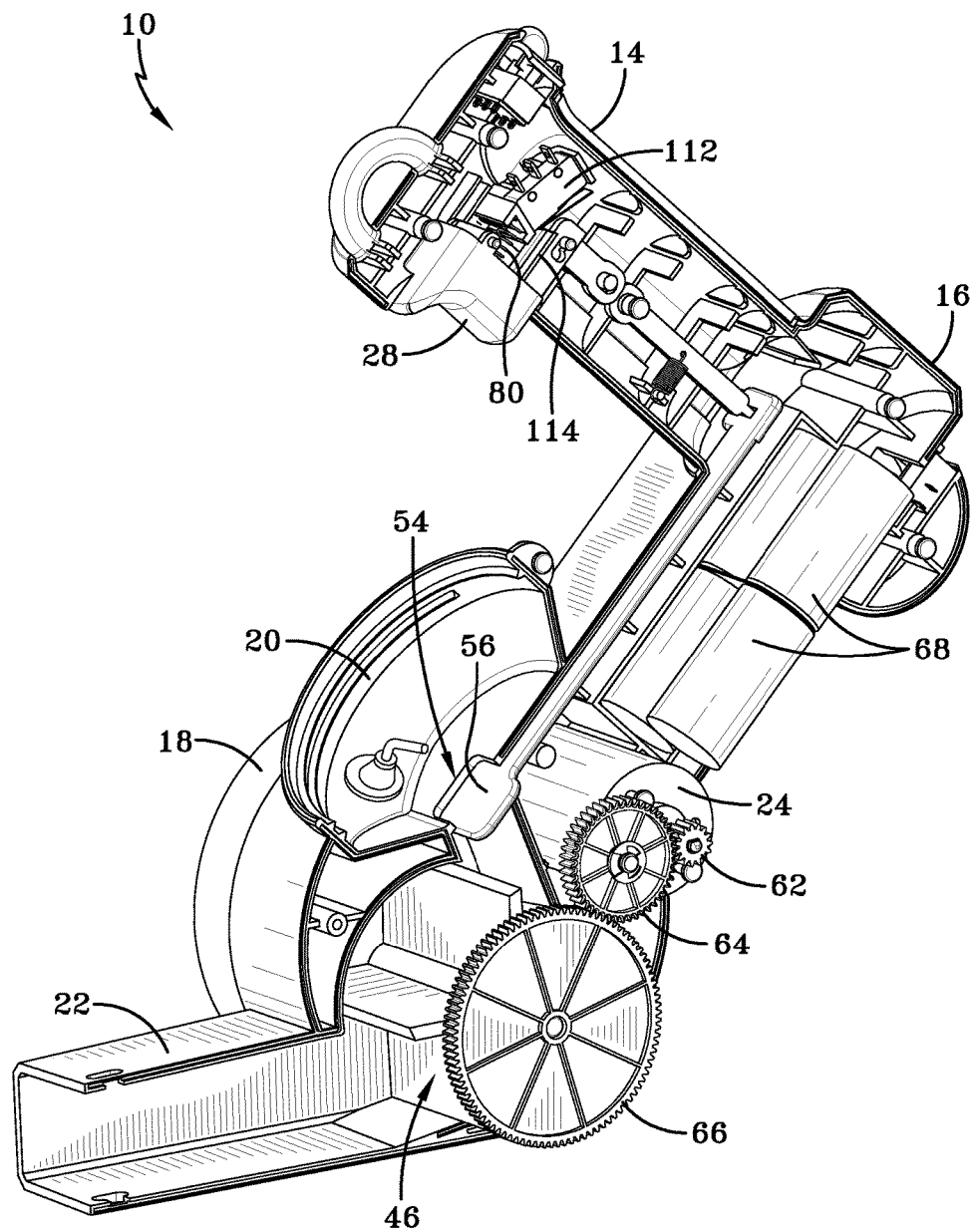

FIG. 3 is a partially cut away, perspective view of the spreader 10 of FIG. 1, showing one way to mechanically couple motor 24 and rotor 46. A drive gear 62 on the shaft of motor 24 may engage an intermediate gear 64 that engages a rotor gear 66 that is coaxial with rotor 46. Other means to couple motor 24 and rotor 46 may include, for example, belts, direct drive, differing numbers and types of gears, fluid couplings, etc.

Spreader 10 may include one or more batteries 68 to power the motor 24. Batteries 68 may be housed, for example, in first housing 16. Batteries 68 may be, for example, rechargeable. Recharging may be performed with the batteries 68 in place in housing 16 using a conventional charging device, or the batteries 68 may be removed for recharging, in a known manner. Spreader 10 may include a conventional AC electric plug, for corded operation from an AC supply. The AC plug may be male or female.

Figure 4:
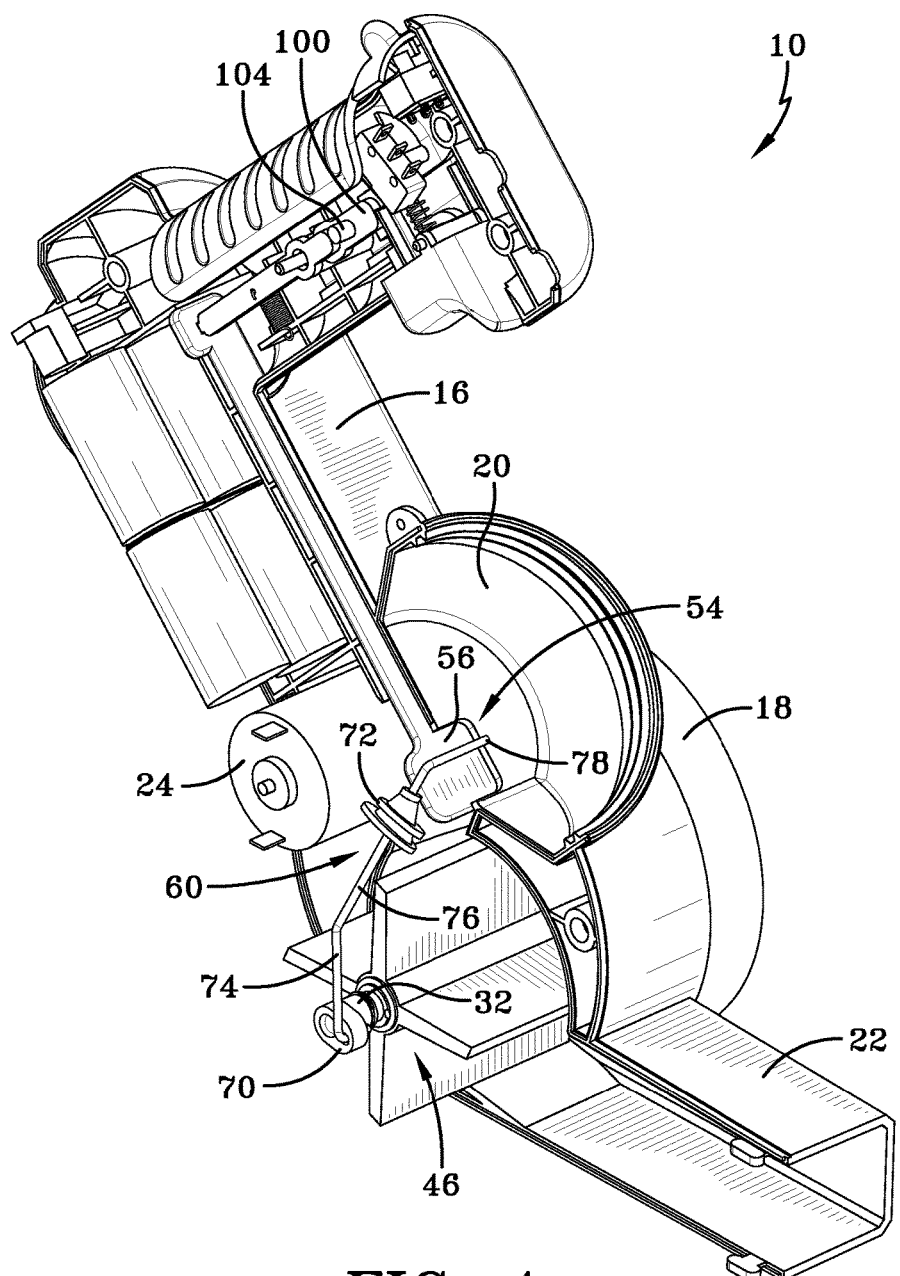
Figure 5:
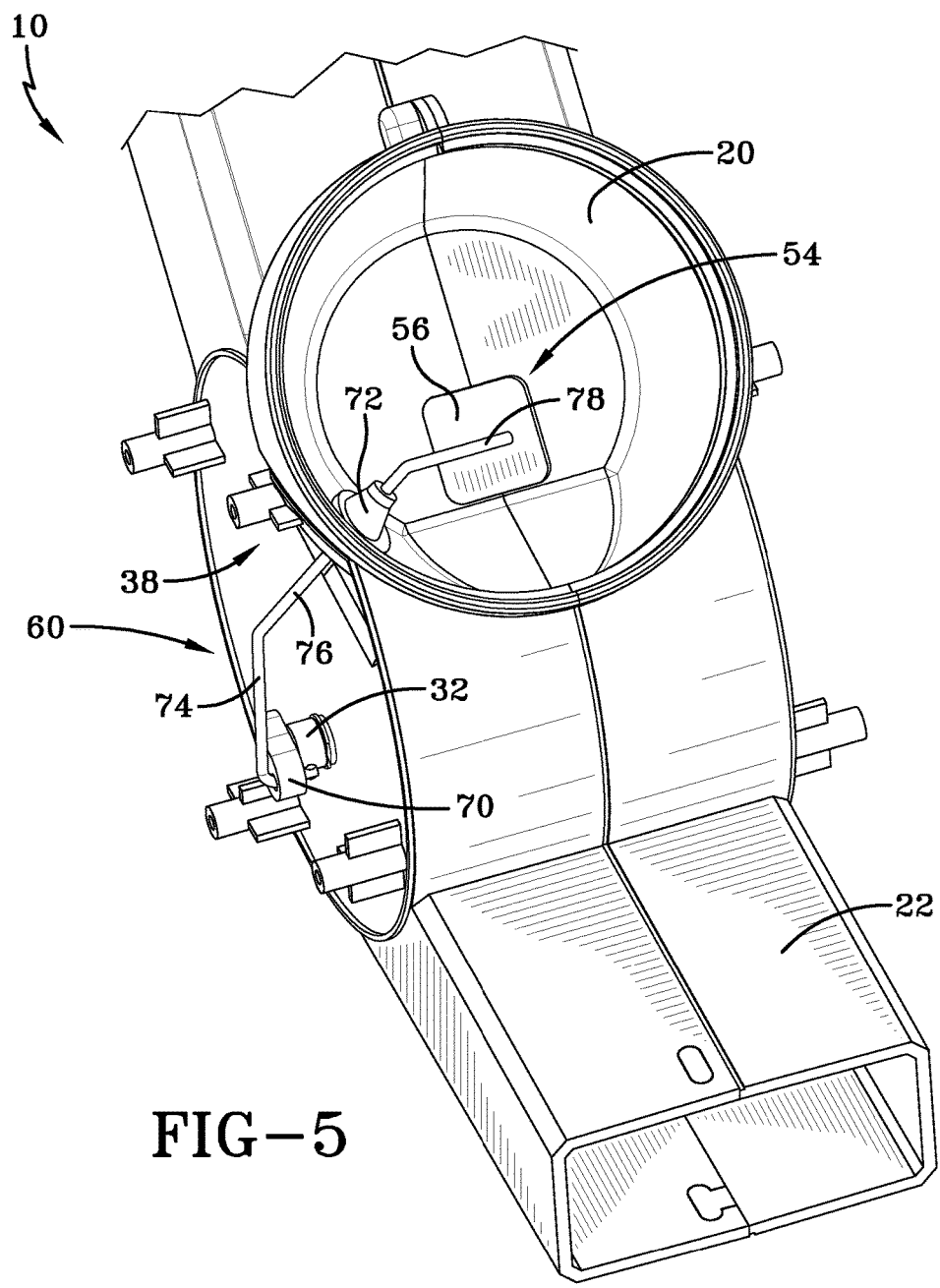

FIG. 4 is a partially cut away, perspective view of another side of the spreader 10 of FIG. 1, showing the structure of an embodiment of an agitator 60. FIG. 5 is an enlarged view of a portion of FIG. 4. An eccentric drive 70 may be fixed on an end of the shaft of rotor 46, outside of closed axial end 38 (FIG. 5). Agitator 60 may include, for example, a small diameter rod fixed at one end to eccentric drive 70. The other end of the rod may be disposed in passageway 54 in intake housing 20 above gate 56. The rod may be made of, for example, a metal such as stainless steel.

The agitator rod may include three segments 74, 76, 78 that may be angled with respect to each other. Eccentric drive 70 may drive segment 74, which causes segment 78 to move up and down and sideways in intake housing 20. Movement of segment 78 facilitates the flow of particulate matter through the passageway 54, which may be opened and closed by gate 56. Segment 76 may pass through a wall of intake housing 20 (FIG. 5). A seal 72 made of, for example, rubber, may be used to seal the opening between segment 76 and the wall of intake housing 20.

Referring again to FIG. 3, control 28 may control motor 24. Control 28 may be located on handle 14. Control 28 may be, for example, a trigger switch. Control 28 may also be, for example, a variable speed switch, such as a potentiometer. Control 28 may be biased to an "off" position by spring 80. Spring 80 may be disposed between control 28 and an internal surface of handle 14. In the "off" position of control 28, rotor 46 may not be turning.

A micro switch 112 may be disposed in handle 14 adjacent an arm 114 of control 28. When control 28 is depressed, arm 114 may activate micro switch 112 to connect a power supply, for example, batteries 68, to motor 24. When control 28 is released, spring 80 may move control 28 to the "off" (not depressed) position, thereby disengaging arm 114 from micro switch 112 and disconnecting the power supply to motor 24.

Control 28 may also control gate 56 to open and close passageway 54 through intake housing 20. By varying the position of gate 56, the mass flow of particulate matter through the spreader 10 may be varied. In the "off" position of control 28, gate 56 may completely close passageway 54. When gate 56 is closed, particulate matter above gate 56 may not enter the rotor 46. When gate 56 is partially open or fully open, particulate matter above gate 56 may enter the rotor 46.

Figure 6:
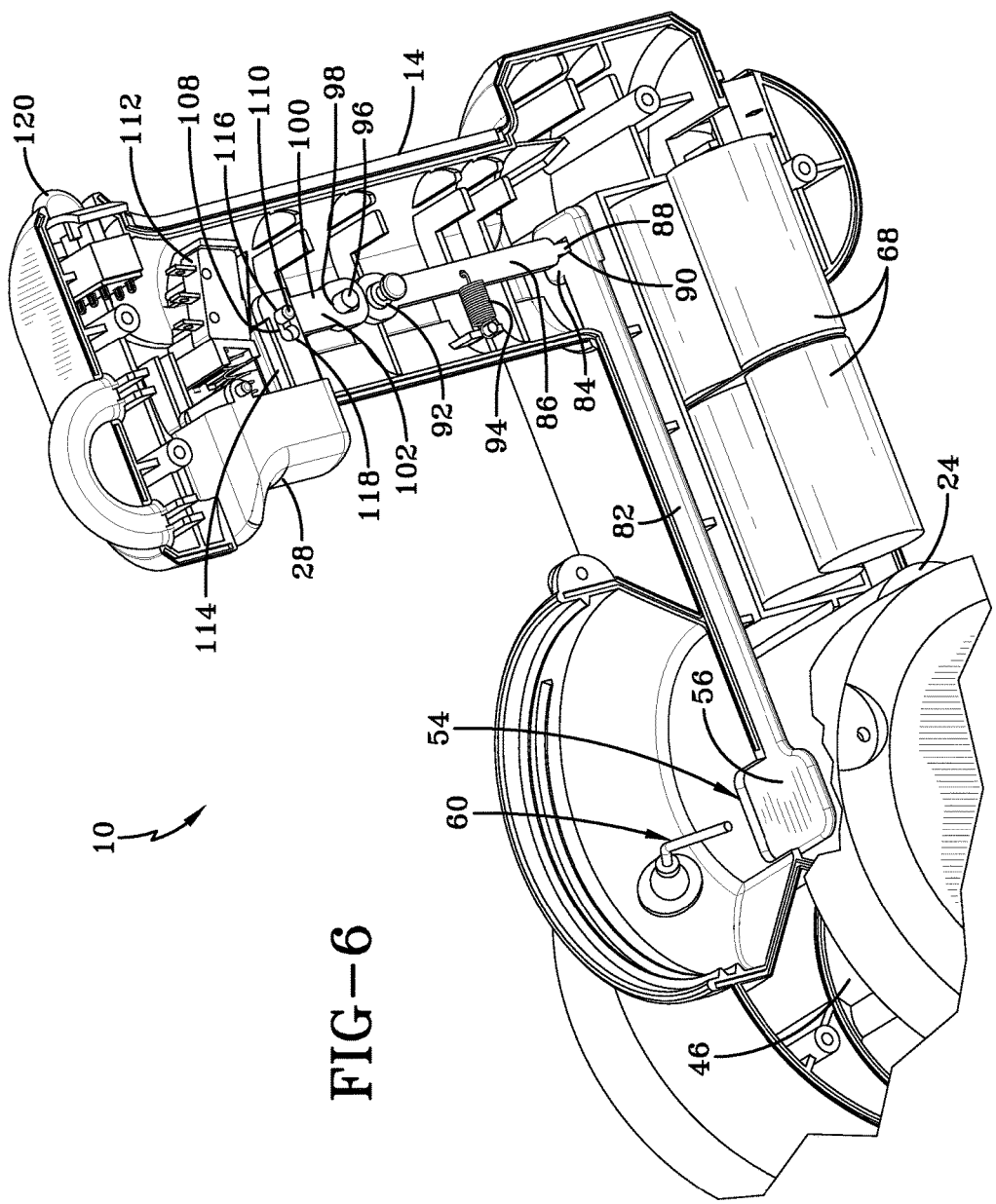
FIG. 6 is a partially cut away, perspective view of the spreader of FIG. 1, showing an embodiment of a control mechanism.

FIG. 6 is a partially cut away, perspective view of the spreader 10 of FIG. 1, showing an embodiment of a connection between control 28 and gate 56. Gate 56 may be fixed to a first linkage member 82 that may be translatable along its longitudinal axis. One end 84 of member 82 may be operatively engaged with a second linkage member 86. Member 86 may engage member 82, for example, via a tab 88 on member 86 that may be inserted in a slot 90 in member 82. Member 86 may be rotatable about a pivot 92. A spring 94 may bias linkage member 86, and thus gate 56, to a closed position. Spring 94 may be disposed between linkage member 86 and an internal surface of handle 14.

One end of second linkage member 86 may include a pin 96 inserted in an opening 98 in a third linkage member 100. Third linkage member 100 may be rotatable about a pivot 102. Pivot 102 may include a pin 104 (FIG. 4) fixed at one end to member 100 and inserted in a pivot hole (not shown) in an internal surface of handle 14. Another end of member 100 may include a pin 110. Pin 110 may be slidable in a slotted opening 108 formed in control 28.

The slotted opening 108 in control 28 may provide a delay function. When the control 28 is not depressed, the spreader 10 may be "off," that is, the rotor 46 may be stationary and the gate 56 may be fully closed. When the control 28 is depressed any amount, the arm 114 may activate micro switch 112 to connect a power supply to motor 24, as described above. However, gate 56 may not begin to open until the pin 110 of linkage member 100 contacts an end 118 of slotted opening 108. Further depressing control 28 may cause pin 110 to rotate linkage member 100 about pivot 102, which causes linkage member 86 to rotate in an opposite direction about pivot 92, which causes linkage member 82 to translate gate 56. Thus, partially depressing control 28 allows the rotor 46 to begin rotating before the gate 56 begins to open. In this way, particulate matter may not enter the rotor 46 when the rotor is stationary, which may prevent jamming of the rotor 46.

When the spreader 10 is "on," that is, the rotor 46 is rotating and the gate 56 is at least partially open, and the control 28 is released by the user, spring 94 may rotate linkage member 86 such that linkage member 82 translates to thereby move gate 56 to a closed position. When gate 56 is fully closed, rotor 46 may continue to rotate until pin 110 of linkage member 100 moves from end 118 of slotted opening 108 to end 116 of slotted opening 108. When pin 110 reaches end 116 of slotted opening 108, arm 114 of control 28 may disengage micro switch 112 and the rotor 46 may no longer rotate, that is, the spreader 10 may be in the "off" position.

Control 28 may be used to continuously or infinitely vary the position of gate 56 to thereby vary the mass flow through the rotor 46. It may also be desirable to vary the speed of motor 24. Compared to infinitely variable speed control of motor 24, a less expensive speed control may be a two speed (high/low) control. A speed control 120 may be disposed on the handle 14. The speed control 120 may have two positions corresponding to high speed and low speed.

In the high speed position or mode, all the batteries 68 may be used to power the motor 24. For example, five batteries 68 may each have a voltage of 1.2 volts. In the high speed mode, the voltage supplied to motor 24 may be 6.0 volts. In the low speed mode, one battery, for example, may be disconnected so that the voltage supplied to the motor 24 is 4.8 volts.

The diameter of the rotor and the angular velocity of the rotor determine the speed at the tip of the paddle. The types of particulate matter that may be used in the spreader may have different resistances to shattering and pulverization. For a given type of particulate matter, the paddle tip speed may be limited to avoid shattering the particulate matter.

Figure 8:
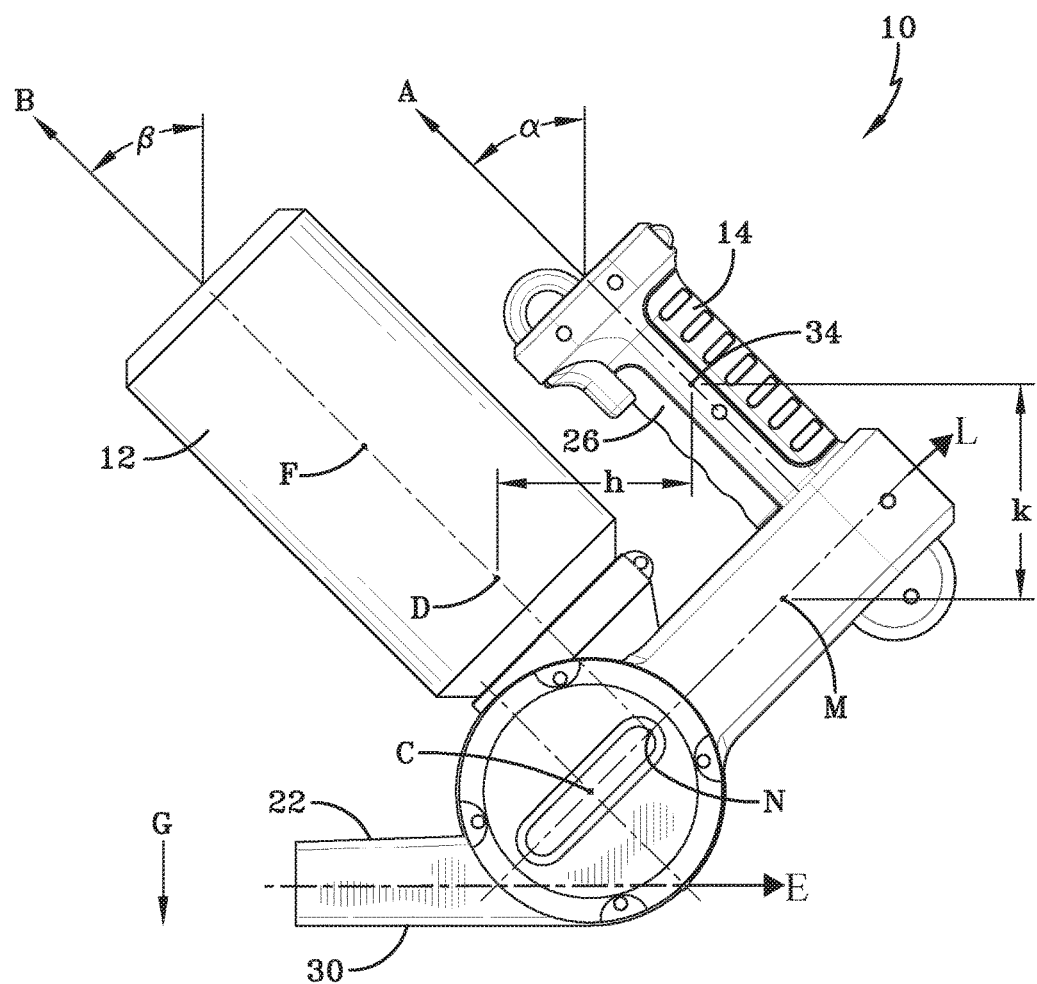
FIG. 8 is a side view of the spreader of FIG. 1.

FIG. 8 is a side view of the spreader 10 of FIG. 1 illustrating a position wherein the spreader 10 may be operable for gravity-feed operation. In the position shown in FIG. 8, the rotor axis C may be horizontal. The exit channel 22 may have a lower surface 30 that may be planar. In the position of FIG. 8, the lower surface 30 may lie in a horizontal plane that may be normal to the local gravity vector G (vertical direction). Thus, the exit channel 22 may have a longitudinal axis E that is horizontal, that is, normal to the local gravity vector, and perpendicular to the longitudinal axis of the rotor 46 when the spreader 10 is in the operating position. The axes A, B of the handle 14 and canister 12 may form angles alpha and beta, respectively, with the vertical.

In FIG. 8, the angles alpha and beta may be the same or different. In one embodiment, alpha and beta may be equal so that A and B may be parallel. Alpha may range from about thirty degrees to about sixty degrees, or from about forty degrees to about fifty degrees, or may be about forty-five degrees. Beta may range from about thirty degrees to about sixty degrees, or from about forty degrees to about fifty degrees, or may be about forty-five degrees. Alpha and beta may be chosen to minimize the horizontal separation h between the center of gravity D of the spreader 10 and the midpoint 34 of the grip portion 26 of handle 14. Minimizing the distance h may contribute to ease of handling the spreader 10.

In the position shown in FIG. 8, the midpoint 34 of the grip portion 26 of the handle 14 may have at least the same elevation as the approximate center of gravity D. Or, the midpoint 34 may be vertically above the center of gravity D a distance k. The center of volume F of the canister 12 may be vertically above the rotor axis C. The center of volume M of the first housing 16, which may contain batteries 68, may be vertically above the rotor axis C. The center of volume N of the motor 24 may be vertically above the rotor axis C. The center of gravity D of the spreader 10 may be vertically above the rotor axis C. The locations of the centers of volume, center of gravity, and axis of rotation may contribute to ease of handling the spreader 10.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A portable spreader for use in an operating position by a pedestrian to project a selected particulate material onto a pedestrian surface having a local gravity vector, the spreader comprising: a first housing having a first end and a second end and a longitudinal axis extending therebetween; a rotor housing supported at the first end of the first housing and having an entrance aperture and an exit aperture; a rotor mounted inside the rotor housing for rotation about a longitudinal axis perpendicular to the longitudinal axis of the first housing, wherein the longitudinal axis of the rotor is normal to the local gravity vector when the spreader is in the operating position; a rotor driver coupled to the rotor for rotating the rotor; a canister extending from the first end of the first housing above the rotor housing and configured to contain the particulate matter and to deposit the particulate matter through the entrance aperture into the rotor housing by gravity, the canister having a longitudinal axis that is perpendicular to the longitudinal axis of the first housing; an exit channel extending from the exit aperture of the rotor housing, the exit channel having a longitudinal axis that is normal to the local gravity vector and perpendicular to the longitudinal axis of the rotor when the spreader is in the operating position; and a handle extending from the second end of the first housing for supporting the spreader in the operating position, the handle having an elongate grip portion with a longitudinal axis parallel to the longitudinal axis of the canister.

2. The portable spreader of claim 1 wherein, when the spreader is in the operating position, the longitudinal axis of each of the canister and the grip portion of the handle forms an angle with the local gravity vector of from 30 degrees to 60 degrees.

3. The portable spreader of claim 2 wherein, when the spreader is in the operating position, the longitudinal axis of each of the canister and the grip portion of the handle forms an angle with the local gravity vector of from 40 degrees to 50 degrees.

4. The portable spreader of claim 3 wherein, when the spreader is in the operating position, the longitudinal axis of each of the canister and the grip portion of the handle forms an angle with the local gravity vector of 45 degrees.

5. The portable spreader of claim 1 wherein, when the spreader is in the operating position, the longitudinal axis of each of the canister and the grip portion of the handle forms an angle with the local gravity vector, and wherein the angle formed by the longitudinal axis of each of the canister and the grip portion of the handle with the local gravity vector when the spreader is in the operating position is selected to minimize the horizontal separation between the center of gravity of the spreader and the midpoint of the grip portion of the handle.

6. The portable spreader of claim 1 wherein the grip portion of the handle has a midpoint, and wherein when the portable spreader is in the operating position the midpoint of the grip portion of the handle has at least the same elevation as the center of gravity of the spreader.

7. The portable spreader of claim 6 wherein when the portable spreader is in the operating position the midpoint of the grip portion of the handle has an elevation higher than the center of gravity of the spreader.

8. The portable spreader of claim 1 wherein when the portable spreader is in the operating position the center of volume of the canister is vertically above the longitudinal axis of the rotor.

9. The portable spreader of claim 1 wherein when the portable spreader is in the operating position the center of volume of the main housing is vertically above the longitudinal axis of the rotor.

* * * * *